Sept. 17, 1963 J. M. GOTTSCHALK ET AL 3,104,381

MAGNETIC RECORD TRANSDUCER

Filed Nov. 5, 1958 2 Sheets-Sheet 1

INVENTOR.
JUAN M. GOTTSCHALK
HOWARD P. WHITE
CHAO KONG CHOW

BY William E. Cleaver

AGENT

INVENTORS
JUAN M. GOTTSCHALK
HOWARD P. WHITE
CHAO KONG CHOW
BY William E. Cleaver
AGENT United States Patent Office 3,104,381
Patented Sept. 17, 1963

3,104,381

MAGNETIC RECORD TRANSDUCER

Juan M. Gottschalk, Bryn Mawr, Howard P. White, Philadelphia, and Chao Kong Chow, Bryn Mawr, Pa., assignors to Burroughs Corporation, Detroit, Mich., a corporation of Michigan.

Filed Nov. 5, 1958, Ser. No. 772,072
3 Claims. (Cl. 340—174.1)

The present invention relates to a magnetic record transducer and, in particular, to a magnetic record transducer for providing parallel read along a plurality of tracks located very close together.

The art of recording information magnetically on multiple tracks and reading the information therefrom is well known and is in wide spread use. The avoidance or reduction of crosstalk between adjacent read heads has been a primary consideration in the design of multiple track magnetic record transducers, and it is well known to provide magnetic and/or electrostatic shielding between adjacent heads. Conventionally, the shielding has been arranged to screen completely in a physical sense a particular read head from its neighboring read head.

The multiple track techniques employed heretofore have provided information tracks, and reading heads, spaced not closer than 100 mils, or one-tenth inch apart. With such spacing there is sufficient room for placing the necessary shielding material between the reading heads to contain the magnetic energy within a particular reading head sector of the multiple channel transducer. At the same time, with spacing of the order of 100 mils, the shielding material can be placed sufficiently distant from each of the reading heads so as not to shunt away from the intended head undesirably large quantities of the magnetic energy picked up from the record. A reading head pitch of the order of 100 mils also provides sufficient space to include the sensing windings on standard ring-type cores and yet permit ready packaging.

In data processing systems, it is highly desirable that written or printed information which is in a form to be read visually by a human observer, also be read automatically for feeding into the data handling machines. According to one system, ink containing magnetizable particles is used to print or otherwise inscribe letters, numerals or other characters on a paper or other backing; and it is, of course, necessary to provide reading equipment for deriving from the magnetized ink characters signals of unique waveform in order to identify and distinguish the various characters. The system referred to contemplates that magnetic characters of approximately typewriter size, specifically characters whose height is only 120 mils, a little more than one-tenth of an inch, will be read. The method heretofore proposed for reading such characters comprises passing the magnetized characters transversely under a single read head at least as wide as the height of the characters, 120 mils in the present instance. In such a method, the full height of the magnetized character is read by the single head but it is necessary to derive signals indicative of the make-up of the full height of the character at various points along its width. This method may be considered to be a series type of reading.

In a new system for reading magnetized letters, numerals or other characters of typewriter size, the magnetized character is passed transversely under an array of in-line read heads each of which is only as wide as a part of the total height of the character; and in order to recognize the character it is, of course, desirable that every significant stroke or part forming the make-up of the character be detected. Thus, the number of read heads required to read a 120 mil high character is a function of the minimum width of the magnetized printed parts of the character running in the direction of movement of the character past the read head. For illustration, consider the capital letter E. In order that the top horizontal bar, the middle horizontal bar, and the bottom horizontal bar, be detected reliably by a transducer having relative horizontal movement with respect to the character, irrespective of variation in registration of the magnetized character to the read transducer, the distance between adjacent reading heads of the multiple head transducer must be no greater, and preferably less, than the width of the bar of minimum width. For convenience of description, the bars or other parts of a magnetized letter, numeral or other character running in the direction of relative movement of the read heads will be referred to as "strokes." It will be seen that if the letters or characters are 120 mils high, and the minimum width of the strokes is 13 mils, then there must be at least nine reading heads in a unit transducer assembly in order to insure that a stroke will not escape detection. This method of reading may be considered as parallel reading of magnetized characters.

It is therefore an object of the present invention to provide an improved multiple channel magnetic record reading transducer.

It is a further object of the present invention to provide a multiple channel magnetic record transducer for reading letters, numerals or other characters printed or otherwise inscribed with magnetizable ink where the character size is as small as that of an ordinary typewriter character.

It is a further object of the present invention to provide a multiple channel magnetic record transducer for reading letters or other magnetized characters and capable of developing discriminating signals of relatively high signal-to-noise ratio when the reading heads are as close together as, or closer together than, the minimum width of the magnetized strokes forming the character make-up.

In accordance with one feature of the present invention, there is provided a multiple transducer comprising a plurality of gap-aligned reading heads, with adjacent heads being separated by associated shielding members. The shielding members are formed to render unshielded a portion of the respective reading heads close to the magnetized record and yet to provide shielding to keep crosstalk to a satisfactory minimum.

In accordance with another feature of the present invention, each reading head of the multiple transducer is designed such that, with respect to an imaginary plane passing through the gap of the reading head and lying perpendicular to the plane of the head, each head may be considered as made up of two legs, one end of each leg being defined by one of the two sides of the gap and the other end being defined by a point on said imaginary plane opposite said gap, the two legs forming a loop, with one of said legs protruding from said imaginary plane in the form of a lobe or ear-like portion.

According to another feature of the present invention, the individual reading heads of the multiple transducer are stacked in flip-flop or turn-over manner, but with their respective gaps aligned, such that adjacent reading heads have their protruding legs or lobes located on the opposite sides of the imaginary plane passing through the aligned gaps at right angles to the planes of the individual heads.

The foregoing and other objects and features of this invention will be best understood by reference to the following description of a preferred embodiment taken in conjunction with the accompanying drawings wherein.

Figure 1:
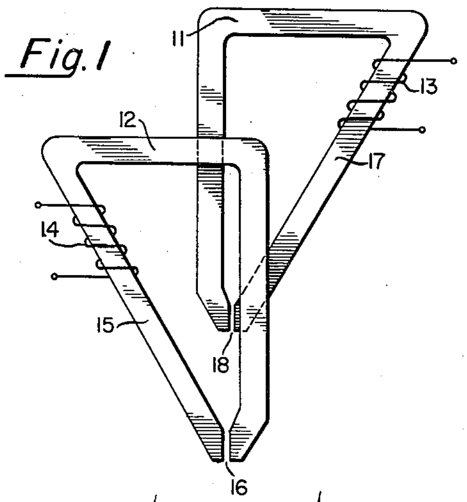
FIG. 1 is a greatly enlarged side elevational view of two adjacent reading heads with one displaced vertically from its normal position in order to show its structure more clearly.

Referring now to FIG. 1, there are shown two reading head cores 11 and 12, one of which, in order to show the structures more clearly, is shown displaced vertically from its normal position relative to the other. In practice each core is so positioned relative to the adjacent core that the gaps (16, 18) are closely adjacent and in alignment, as will become clear. The cores are so constructed that, with respect to an imaginary plane passing through the gaps 16, 18 perpendicular to the planes of the heads, each core may be considered as having two dissimilar legs, one end of each leg being defined by the two sides of the gap, and the other ends of the legs being joined together at a point on said imaginary plane opposite said gap to form a loop. Thus, in FIG. 1, one leg is V-shaped and the other I-shaped. While these are preferred shapes, for a reason to be mentioned, the cores 11, 12 could be D-shaped, or of other suitable shapes, including C-shaped. The important feature of the core structure is to have the cores so shaped that, with gaps in close alignment, portions of adjacent cores occupy different locations thereby to provide room for the sense windings. In FIG. 1, V-shaped legs 15 and 17 are the legs upon which the sense windings 13, 14 are placed. For convenience, these legs will hereinafter be referred to as the "protruding" legs.

The sense windings 13 and 14 are shown in FIG. 1 as having but three turns, but in the actual preferred embodiment, these windings have 600 turns each. Because the V-shaped legs 15 and 17 have substantially straight portions extending to the gaps 16, 18 respectively, the sensing windings may, in the making of the device, be first wound on a bobbin or other form and then slipped on to the protruding leg, thereby avoiding having to wind the winding through the aperture of the ear-like core. This is an important feature since the cores in the actual preferred embodiment are extremely thin, being only 2 to 4 mils thick, while the overall height of the cores is in the neighborhood of 750 mils, three-quarters of an inch.

FIG. 1 also shows the flip-flop or turn-over manner in which two adjacent cores, 11 and 12 in FIG. 1, are stacked in the multiple head unit. It will be noted that the cores are so constructed and positioned that, when the gaps 16, 18 are in close alignment, the lobe or ear-like portion of the core 12, and in particular the protruding V-shaped leg 15, extends well out from the position occupied by core 11, while the lobe portion of core 11, in particular the V-shaped protruding leg 17, extends well out from the position occupied by core 12. When the cores are assembled in their housing, such as in plastic housing 19 depicted in FIG. 4, the multiple cores are stacked very closely together in gap-aligned positions with alternate cores occupying similar positions and with adjacent cores occupying turn-over or 180-degree positions with respect to each other. Because of the lobe-shaped portions of the cores and the turn-over manner of stacking, the space necessary to house the windings is so reduced as to permit relatively simple and small packaging.

Figure 2:
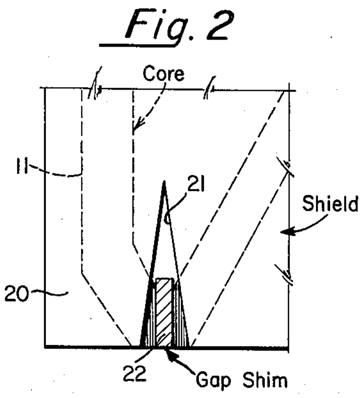
FIG. 2 is a greatly enlarged fragmentary illustration showing one of the cores and one shielding member.

FIGURE 2 is a fragmentary showing of a portion of core 11 with a shield 20 extending all the way down to the bottom of the gap, except for the notched portion 21. The function of the gap shim 22, which may be of brass, is to introduce a high reluctance into the gap and thereby to force the flux from the record to pass through the core material. While the complete shielding technique shown in FIG. 2 has been satisfactory when the reading heads have been located 100 mils or more apart, the technique has been found to be unsatisfactory when the reading heads are very thin, for example 2 to 4 mils, and located very close together, for instance at a 13 mil pitch, such as is necessary in parallel reading of typewriter-size characters. The prior art shielding technique is unsatisfactory because the low reluctance shield provides a shunt path for some of the flux of the extremely weak magnetic field (in the order of one or two oersteds supplied by the magnetized ink of the typewriter-size characters, and the remaining amount of flux through the reading head is insufficient to produce a satisfactory signal.

It has been found that by removing entirely the low reluctance magnetic shield from between read heads spaced only 11 mils apart, to permit more flux to flow through read heads, and using only electrostatic shields, for instance, silver shields, the signals in the read heads will be substantially increased but at the cost of making the crosstalk intolerably large.

Figure 3A:
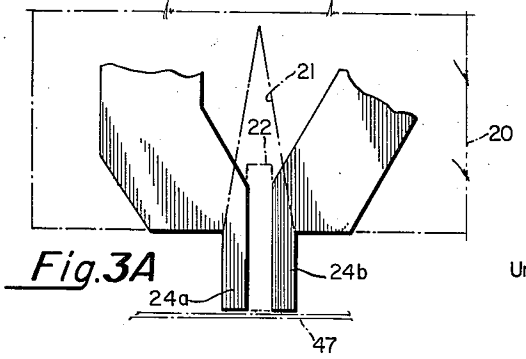
FIG. 3A is an enlargement of a portion of FIG. 3.
Figure 3:
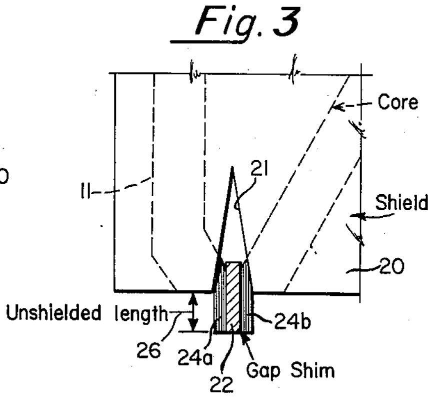
FIG. 3 is a greatly enlarged fragmentary illustration similar to FIG. 2 but showing one of the cores and its shield modified according to one embodiment of the present invention.

FIGURE 3 is a fragmentary illustration similar generally to FIG. 2, but in FIG. 3 the reading head core 11 and the shield 20 have been milled back vertically leaving portions 24*a* and 24*b* of the core protruding beyond the shield at both sides of the gap. Shield 20 is laminated, preferably of alternate sheets of copper and Mu Metal, with the copper sheets occupying both end positions. Such shield provides both magnetic and electrostatic shielding. The arrangement shown in FIG. 3 has been found to be surprisingly satisfactory in that the signal read is substantially stronger with little or no measurable increase in crosstalk. As shown more clearly in the enlarged showing of FIG. 3A, the distance from the magnetic record surface 47 to the shield 20 at the two sides of the notch 21 has been increased by cutting back the shield, thereby increasing the reluctance of the path from the record through the Mu Metal shield and back to the record. This forces a larger portion of the total flux from the record to pass through the reading head, and an appreciable and desirable increase in signal is obtained, without causing an objectionable increase in crosstalk.

In one method of manufacture, the multiple head transducer is assembled with the shields initially placed all the way down to the lower edge of the gaps, as shown in FIG. 2, and then an empirically determined portion of the heads is milled away together with the shield material. It has been found that if the unshielded portion 24*a*, 24*b* is of the order of 5 to 7 mils, where the reading heads are 2 mils thick (thin) and are spaced at a 13 mil pitch, good signal-to-noise ratio is obtained. It is to be understood, of course, that the empirically determined 5 to 7 mils of unshielding referred to is subject to be varied, being dependent upon the field strength of the recorded information, the reading head pitch, etc. It is also to be understood that the milling back of the head along with the shield is not necessary, or even desirable magnetically, but is the unavoidable result of the milling operation, referred to above. More desirably, the full tips of the head should extend down below the shield.

Figure 4:
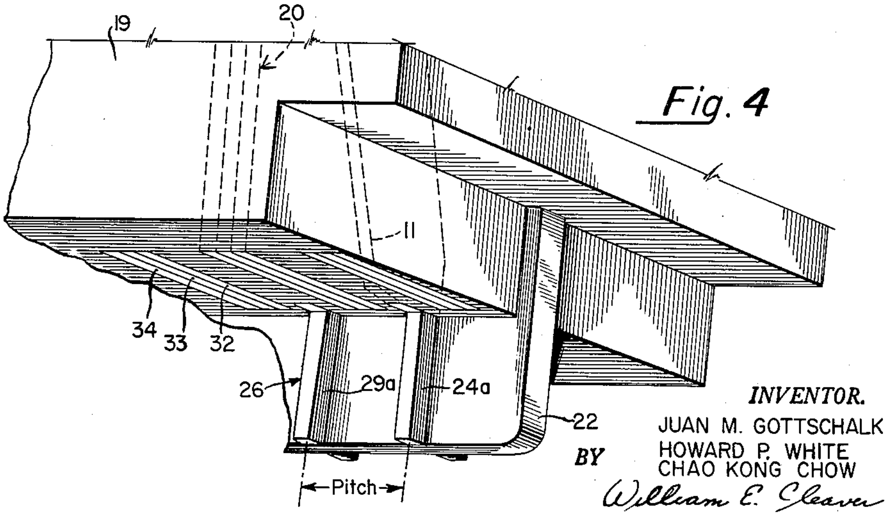
FIG. 4 is a vastly enlarged fragmentary illustration of a multiple transducer according to one embodiment of the present invention.

FIGURE 4 is a vastly enlarged pictorial showing of a section of a multiple magnetic record transducer in accordance with the present invention. The housing 19 may be of any satisfactory potting material such as Hysol 6020 Epoxy. Reference numeral 22 is the gap shim; 24*a* and 29*a* are the portions of cores 11 and 12, respectively, extending below the lower edge of the shield 20, which shield is shown as being a sandwich of three elements 32, 33 and 34, respectively sheets of copper, Mu Metal and copper. A five-element sandwich of copper and Mu Metal may be used, to advantage. In FIG. 4, only two reading heads are to be seen, but it is to be understood, of course, that in practice, depending on the logic circuitry and the type of matter to be read, the multiple channel reading head will include a much larger number of heads. As indicated previously, for transverse reading of characters of 120 mil height the heads are stacked at a 13 mil pitch, thirteen mils having been chosen since it is not greater than the minimum width of the horizontal strokes forming the make-up of the characters to be read in the particular system to which the present invention is directed. Such a pitch assures that at least one reading head will travel over each horizontal stroke of the character's make-up. To assure reading, irrespective of an off-registration of the character under the transducer, the actual transducer is comprised of four groups of 11 heads each. Each group covers a total span of 132 mils (11 times 13 mils) and forms a continuous stack, the sense windings of corresponding heads of each group being connected in series. The novel circuitry by which reading is accomplished irrespective of which nine or ten heads of one or more groups actually traverse the character is being described and claimed in a separate copending application.

Figure 5:
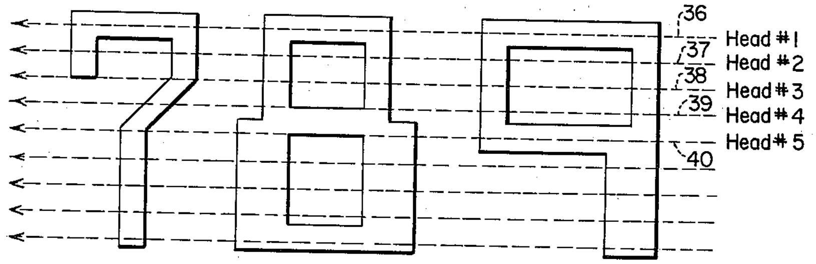
FIG. 5 shows three illustrative numeral characters.

In FIG. 5 there are shown three "ABA" numerals 7, 8 and 9. These characters are designated "ABA" since their peculiar configurations have been adopted, tentatively at least, by the American Banking Association as configurations which will facilitate reading of magnetic characters. The characters shown in FIG. 5 are printed with magnetizable ink on the paper or other backing and then magnetized with an alternating current signal of 30 kilocycles (kc.).

Figures 6, 7:
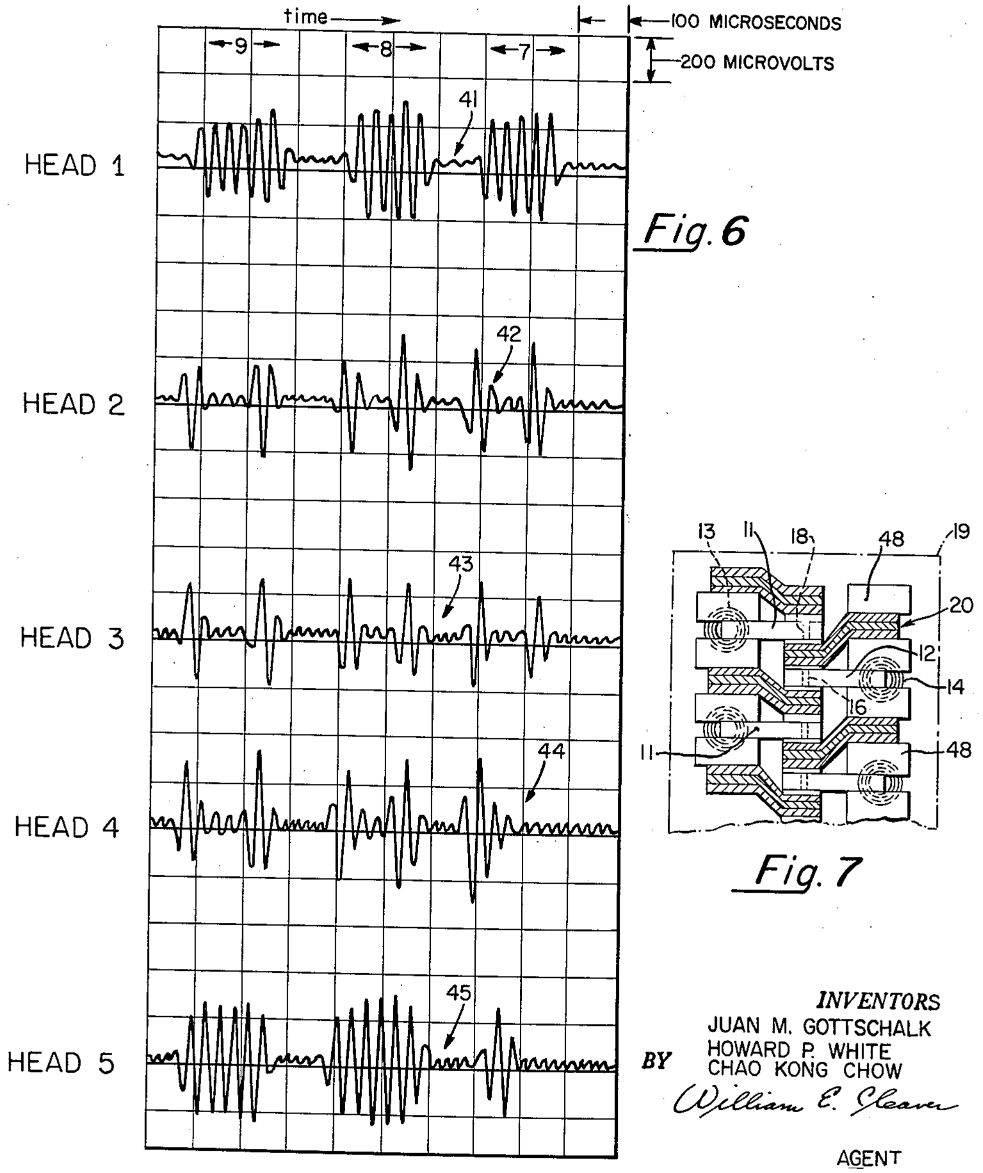
FIG. 6 shows the waveforms detected by reading heads according to the present invention, when these heads scanned portions of the numerals shown in FIG. 5.
FIG. 7 shows a top view of a portion of the multiple head transducer.

FIGURE 6 is a graphical representation of the waveforms of the signals actually read by the upper five stationary reading heads when the document bearing these numerals 7, 8, 9 was passed under the heads. The field strength at the gaps of the read heads, located one-half mil from the record surface, was extremely weak, measuring the order of one-half oersted. The document was moved from left to right at a speed of approximately 400 inches per second, the path of relative movement of the five reading heads being depicted in FIG. 5 by the dotted-line paths 36 to 40. The arrowheads at the left indicate the direction of relative movement of the stationary heads.

It has been found that if the document on which the characters are inscribed is to be passed under the read heads at high speed, for instance 400 inches per second, the definition of the signal read can be greatly improved if the characters being read are magnetized with a relatively high frequency A.-C. magnetizing signal, for instance of the order of 30 kc. By this method, signals of vastly improved significant details may be derived to facilitate distinguishing one character from another. For example, if the number 9 shown in FIG. 5 where to have been magnetized with a 15 kc. signal, rather than a 30 kc. signal, then instead of the six cycles of peak-to-peak voltage variations shown at the upper left portion of FIG. 6 produced when the top bar of numeral 9 moved transversely under read head No. 1, there would only have been produced three cycles of peak-to-peak voltage variations. It is apparent that if the read circuitry involves deriving from the voltage variations a single pulse, as by rectification, the pulse derived from the six peak signal will have more precise definition than a pulse derived from a 3 peak signal.

Referring again to FIGS. 5 and 6, let us consider in some detail the waveforms of the signals read as the document bearing the numerals 7, 8, 9, which had been magnetized by a 30-kc. signal, was passed under the reading heads from left to right at 400 inches per second. While actually the signal waveforms shown in FIG. 6 were developed by transverse movement of the document past stationary heads, it will be more convenient to describe the signals as if they had been generated by moving the read heads from right to left past the numerals along the dotted line paths 36–40 and in the direction of the arrows.

Considering first read head No. 1, we see in FIG. 5 that head No. 1 passed first across the long horizontal upper bar of the numeral 9, then across the somewhat shorter horizontal upper bar of the numeral 8, and then across the horizontal upper bar of the numeral 7 the length of which is similar to that of the numeral 8. Looking now at FIG. 6, wherein graph waveforms are shown on a time axis with time increasing from left to right, we see that the waveform 41 produced by head No. 1 is comprised of a relatively long six-peak A.-C. signal produced as head No. 1 passed over the horizontal bar of the number 9, a somewhat shorter five-peak A.-C. signal produced as the head passed over the horizontal bar of the number 8, and a substantially similar five-peak A.-C. signal produced as the head passed over the horizontal bar of the number 7.

Returning now to FIG. 5, we see that head No. 2 passes first over a short vertical bar on the right side of the number 9, then over a short vertical bar on the left side of the number 9, then over a short vertical bar on the right side of the number 8, and so on, as shown by track 37. Looking now at FIG. 6, the waveform 42 shows first a two-peak (positive) A.-C. signal developed as the head No. 2 passed over the right vertical bar of the number 9, another two-peak (positive) A.-C. signal developed as head No. 2 passed over the left vertical bar of the number 9, and generally similar A.-C. signals developed as the head passed over the vertical bars of the numbers 8 and 7. It is to be noted in the waveform 42 that the time elapsing between the signals representing the spaced vertical bars of the number 9 is greater than that for the numbers 7 or 8, this being consistent with the actual spacings of the vertical bars of the numbers.

It is not belived necessary to describe in detail the waveforms 43, 44 and 45, shown in FIG. 6, produced respectively by read heads Nos. 3, 4 and 5 as they moved along paths 38, 39 and 40 of FIG. 5. An examination of the waveforms will show them to be fully in accordance with the structure of the numerals being read. For example, note that, in the waveform 44 produced by read head No. 4, the signal produced when the head crossed the vertical bar of the number 7 is displaced slightly to the left as compared to the signal produced when read head No. 5 crossed the vertical bar of the number 7, as shown in waveform 45. This, of course, is as it should be since head No. 4 crosses the bar of the number 7 before head No. 5 does, as shown by the dotted-line paths 39, 40.

Although the signal waveforms shown in FIG. 6 were derived by reading characters printed with magnetizable ink in the "ABA" form, the reading head assembly provided by the present invention is fully capable of reading and recognizing characters of approximately typewriter size and of substantialy standard configuration. In other words, character recognition by means of the multiple-head transducer described and claimed herein, is definitely not limited to the reading of the peculiarly-shaped characters presently adopted by the ABA.

FIGURE 7 is a cross-sectional top view of the multiple-head unit according to the present invention and shows the arrangement of the read head cores, 11, 12; the gaps 18, 16, etc.; the sense windings 13, 14; the sandwich shields 20; and the potting 19. Spacers 48, not heretofore mentioned, are also shown. It will be noticed that in the potted unit, the shields become bent around the sense windings the room taken up by the 600-turns sense windings being clearly indicated. The copper sheets of the shield 20 are connected by a connection not shown to a ground point for the read signal circuits.

While we have described above the principles of our invention in connection with specific apparatus, it is to be clearly understood that this specific description is made only by way of example and not as a limitation to the scope of our invention as set forth in the objects thereof and in the accompanying claims.

We claim:

1. A multiple channel magnetic record transducer for use with a system to recognize characters formed with magnetized ink wherein said ink provides a relatively weak magnetic field, comprising, a housing member, a plurality of cores each having a gap therein and each being non-symmetrically arranged to form a lobe-shaped leg with respect to a plane passing through said gap and lying perpendicular to the plane of said core, a plurality of sensing windings one each being wound upon the lobe-shaped leg of one of the cores, said cores being mounted in said housing member with their respective gaps aligned to intercept the magnetic field of a character moved transversely thereunder and being further mounted in turn-over fashion with the lobe-shaped legs of every other core being disposed on the same side of said plane passing through the aligned core gaps and lying perpendicular to the planes of the respective cores, a plurality of shielding members mounted in said housing member with one each physically separating each core member from an adjacent core member, said shielding members respectively formed to render unshielded a predetermined length of each of said core gap portions, said length lying substantially parallel to said core gap plane and being determined to provide a flux path of relatively high permeability through said cores as compared to a flux path through the associated shielding members while providing sufficient shielding to limit to a minimum the interaction between said core members.

2. A multiple channel magnetic record transducer according to claim 1 wherein the core members are mounted in said housing member with a pitch between adjacent cores not greater than the minimum width of a magnetized stroke making up said characters and running longitudinally with the direction of relative movement of said character.

3. A multiple channel magnetic record transducer for use with a system to recognize characters formed with magnetized ink wherein said ink provides a relatively weak magnetic field, comprising, a housing member, a plurality of reading head cores each having a substantially right triangular shape and having a gap therein, a plurality of sensing windings at least a portion of each located on the hypotenuse leg of the triangularly shaped reading head cores, said cores being mounted in said housing member with the respective gaps aligned to intercept the magnetic field of a magnetized character passed thereunder and being further mounted in turn-over fashion such that the hypotenuse legs of adjacent cores are disposed on opposite sides of a plane passing through the aligned core gaps, a plurality of shielding members mounted in said housing member with one each physically separating each core member from an adjacent core member, said shielding members being laminated and comprised of alternate sheets of high electrical conductivity and high magnetic permeance, thereby to provide electrostatic and magnetic shielding, said shielding members being formed to render unshielded a predetermined length of each of said core gap portions, said unshielded length of each core lying in a direction substantially parallel to the walls of said core gap and being determined to provide a flux path of relative high permeance through said cores as compared to a flux path which includes the associated shielding members while providing sufficient shielding to limit to a minimum the interaction between said core members.

References Cited in the file of this patent

UNITED STATES PATENTS

| | | |
|---|---|---|
| 2,700,588 | Williams et al. | Jan. 25, 1955 |
| 2,732,275 | MacNeill | Jan. 24, 1956 |
| 2,735,901 | Coates | Feb. 21, 1956 |
| 2,769,866 | Kornei | Nov. 6, 1956 |
| 2,863,002 | Brower | Dec. 2, 1958 |
| 2,880,280 | Gernert et al. | Mar. 31, 1959 |
| 2,888,522 | McCutchen et al. | May 26, 1959 |
| 2,902,770 | Warren | Oct. 13, 1959 |
| 2,922,231 | Witt | Jan. 26, 1960 |
| 2,923,779 | Namenyi-Katz | Feb. 2, 1960 |